(12) United States Patent
Record et al.

(10) Patent No.: US 8,739,966 B2
(45) Date of Patent: Jun. 3, 2014

(54) FLAT WIRE CONVEYOR BELT WITH MULTIPLE CONNECTING RODS AND STRENGTHENING EDGES

(71) Applicant: Wire Belt Company of America, Londonderry, NH (US)

(72) Inventors: Shane Record, Salem, NH (US); Kevin Bostaph, Raymond, NH (US); Dale Strassner, Pembroke, NH (US); Ray Tomsett, Kent (GB); Ronald Arndt, Herrnburg (DE)

(73) Assignee: Wire Belt Company of America, Londonderry, NH (US)

( * ) Notice: Subject to any disclaimer, the term of this patent is extended or adjusted under 35 U.S.C. 154(b) by 0 days.

(21) Appl. No.: 13/622,407

(22) Filed: Sep. 19, 2012

(65) Prior Publication Data

US 2013/0092513 A1 Apr. 18, 2013

Related U.S. Application Data

(60) Provisional application No. 61/626,074, filed on Sep. 20, 2011.

(51) Int. Cl.
*B65G 17/06* (2006.01)

(52) U.S. Cl.
USPC .......................................... 198/848; 198/851

(58) Field of Classification Search
USPC ................................................ 198/848, 851
See application file for complete search history.

(56) References Cited

U.S. PATENT DOCUMENTS

| | | | | |
|---|---|---|---|---|
| 2,214,739 A | * | 9/1940 | Guba | 198/848 |
| 2,420,363 A | * | 5/1947 | Espenas | 403/43 |
| 2,633,228 A | * | 3/1953 | Potts | 198/848 |
| 2,826,383 A | * | 3/1958 | Spencer, Jr. | 245/10 |
| 2,862,602 A | | 12/1958 | Greer at at. | |
| 3,563,366 A | | 2/1971 | Daringer | |
| 3,794,155 A | * | 2/1974 | Bechtel, Jr. | 198/848 |
| 3,854,575 A | * | 12/1974 | Fraioli, Sr. | 198/831 |
| 4,036,352 A | | 7/1977 | White | |
| 4,613,037 A | | 9/1986 | Park et al. | |
| 4,957,597 A | | 9/1990 | Irwin | |
| 5,040,236 A | | 8/1991 | Costello | |
| 5,176,249 A | | 1/1993 | Esterson et al. | |
| 5,743,376 A | | 4/1998 | Ochs | |
| 5,934,448 A | | 8/1999 | Kucharski et al. | |
| 5,950,807 A | | 9/1999 | Greer | |
| 6,070,715 A | | 6/2000 | Etherington et al. | |
| 6,102,196 A | * | 8/2000 | Domit, Jr. | 198/848 |
| 6,195,868 B1 | | 3/2001 | Etherington et al. | |
| 6,202,833 B1 | | 3/2001 | Greer | |
| 6,371,284 B1 | | 4/2002 | Pasch | |
| 6,615,978 B1 | * | 9/2003 | Farrell | 198/848 |

(Continued)

*Primary Examiner* — Gene Crawford
*Assistant Examiner* — Keith R Campbell
(74) *Attorney, Agent, or Firm* — Devine, Millimet & Branch; Paul C. Remus; Kimberly A. Peaslee

(57) ABSTRACT

The flat wire conveyor belt comprises multiple part connecting rods used to incrementally extend the length of the flat wire conveyor belt and provide ease of repair and installation. The flat wire conveyor belt comprises U-shaped connecting rods. The multiple part connecting rods can be connected in a series of two or more to span the width of the flat conveyor belt. The flat wire connecting rods can connect to the picket, to each other, or via and intermediate connecting rod. The flat wire conveyor belt provides strengthened edges.

6 Claims, 11 Drawing Sheets

(56) References Cited

U.S. PATENT DOCUMENTS

| | | |
|---|---|---|
| 7,494,005 B2 | 2/2009 | Messick, Jr. et al. |
| 7,530,454 B2 * | 5/2009 | Neely et al. ................... 198/853 |
| 7,721,877 B2 * | 5/2010 | Maine et al. ................... 198/848 |
| 7,975,840 B2 | 7/2011 | Messick, Jr. et al. |
| 2003/0144098 A1 | 7/2003 | Fye et al. |
| 2009/0078544 A1 | 3/2009 | Messick, Jr. et al. |
| 2009/0145732 A1 * | 6/2009 | Maine et al. ................... 198/853 |

* cited by examiner

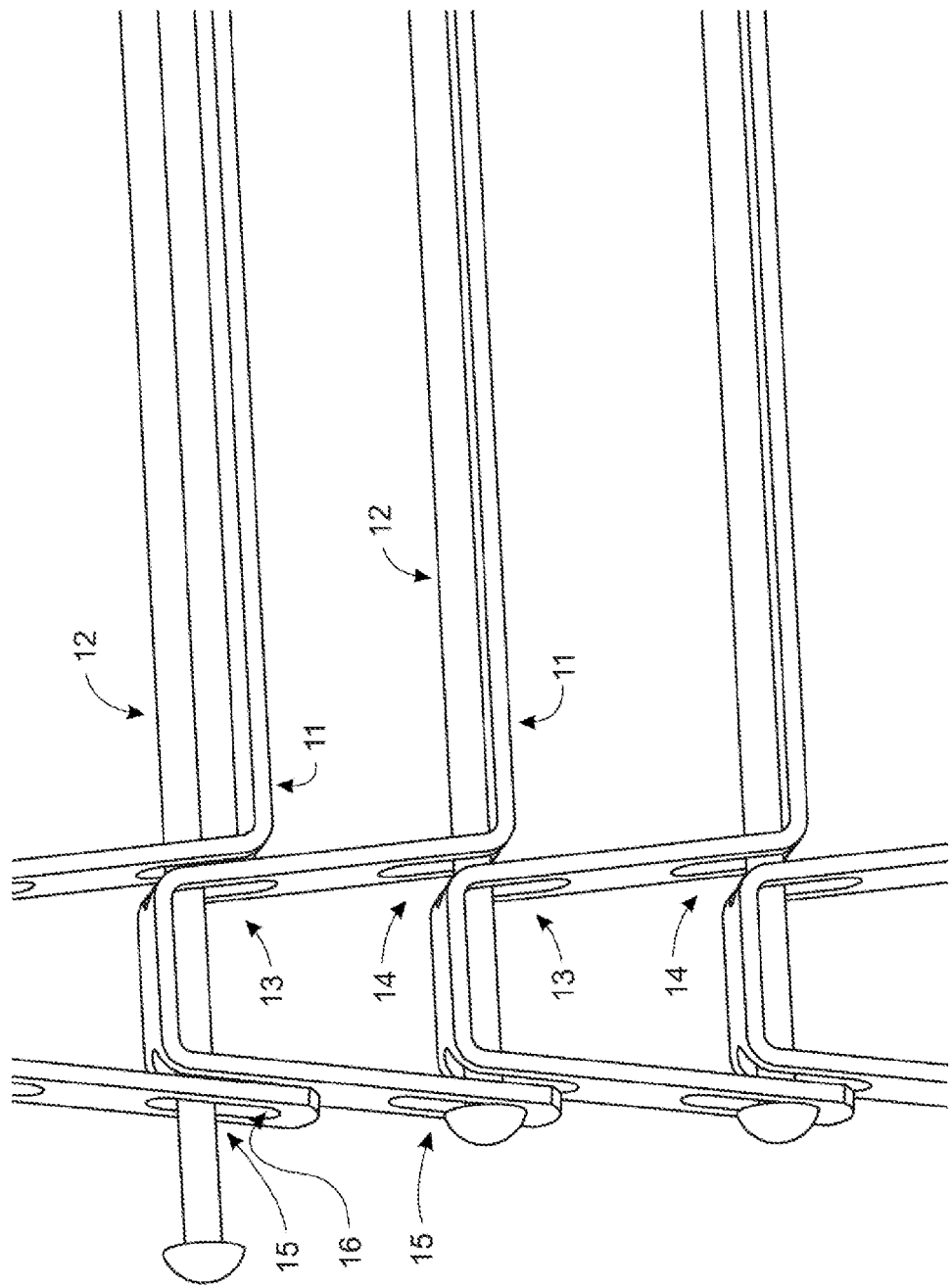

US 8,739,966 B2

FLAT WIRE CONVEYOR BELT WITH MULTIPLE CONNECTING RODS AND STRENGTHENING EDGES

CROSS REFERENCE TO RELATED APPLICATIONS

This Application claims the benefit of U.S. Provisional Application No. 61/626,074 filed Sep. 20, 2011 the contents of which are incorporated by reference herein in their entirety.

FIELD OF THE INVENTION

The present invention relates to flat wire conveyor belts. In particular, it relates to a flat wire conveyor belt having multiple part connecting rods and strengthened edges.

BACKGROUND OF THE INVENTION

Conveyor belts are commonly used for conveying articles during cooling, drying, coating, cooking and many other applications. Different types of conveyor belts used for such applications include wire mesh belts, balanced weave belts, and flat wire belts.

When assembling a flat wire conveyor belt 10 of the prior art, as shown in FIG. 1, multiple wire elements or pickets 11, which extend the full width of the flat wire belt 10, are held together by multiple connecting rods 12. Each picket 11 has a first set of holes 13 and a second set of holes 14. Each picket is bent so that adjoining pickets 20, 21 can be arranged to allow a connecting rod 12 to be inserted through each of the holes in the first set of holes 13 of one picket 20 and each of the holes in the second set 14 of holes of the adjoining picket 21. The connecting rods also span the full width of the flat wire conveyor belt 10.

Because of the length of the connecting rods, the process of inserting them through the holes in the pickets is cumbersome and time consuming and requires a large space. It is a goal of the present invention to provide a flat wire belt that can be assembled more quickly and easily in a smaller space without the need of tools.

Additionally, as shown in FIG. 2, a flat wire conveyor belt of the prior art has weak edges. All the holes in the second set of holes 14 are the same length. This means the holes 15 in the second set of holes that are at each end of the picket 11, because they are not in sections of the picket that are bent, are such that the part of the picket forming the wall of the hole closest to the end of the picket 16 does not contact the connecting rod 12 inserted through the hole 15. It is a goal of the present invention to strengthen the end of the flat wire belt by having the connecting rod contact the part of the picket forming the wall of the hole closest to the end of the picket.

SUMMARY OF THE INVENTION

One aspect of the present invention is a flat wire conveyor belt comprising: a plurality of pickets, wherein each picket comprises a first end and a second end, and each picket has a length defining the width of a flat wire conveyor belt; a plurality of linking regions bendably formed and spaced along the length of each picket, wherein each linking region has a first set of holes and a second set of holes; a plurality of first edge linking regions, wherein each first edge linking region is the linking region formed at the first end of the picket, and each first edge linking region comprises a first outer edge hole wherein the first outer edge hole is the hole in the first set of holes formed nearest to the first end of each picket; a plurality of second edge linking regions, wherein each second edge linking region is the linking region formed at the second end of each picket, and each second edge linking region comprises a second outer edge hole wherein the second outer edge hole is the hole in the first set of holes formed nearest to the second end of each picket; and a plurality of connecting rods, wherein each connecting rod comprises a first end and a second end, and each connecting rod is configured to pass through the first set of holes of at least one linking region on a first picket and the second set of holes of the at least one linking region on an adjoining picket, and each connecting rod has a length less than the width of the flat wire conveyor belt, thereby reversibly linking two adjoining pickets and incrementally extending a length of the flat wire conveyor belt.

In one embodiment of the flat wire conveyer belt, the second end of the plurality of connecting rods cannot pass through the first outer edge hole and the second outer edge hole.

In one embodiment of the flat wire conveyor belt, the first outer edge holes and the second outer edge holes further comprise an inner surface and the plurality of connecting rods further comprise an outer surface, and wherein the inner surface of the outer edge holes is in contact with the outer surface of the connecting rods, thereby strengthening the edge of the flat wire conveyor belt.

In one embodiment of the flat wire conveyor belt, the second end of the connecting rod comprises a button.

In one embodiment of the flat wire conveyor belt, the second end of the connecting rod comprises a hook.

In one embodiment of the flat wire conveyor belt, the second end of the connecting rod comprises a flattened portion that cannot pass through the first outer edge hole and the second outer edge hole once rotated.

In one embodiment of the flat wire conveyor belt, the first end of the connecting rod comprises a flattened portion that cannot pass through the first set of holes and the second set of holes once rotated.

In one embodiment of the flat wire conveyor belt, the first end of the plurality of connecting rods comprises a threaded portion.

In one embodiment of the flat wire conveyer belt, a first connecting rod reversibly connects to a second connecting rod to span the width of the flat wire conveyor belt.

In one embodiment of the flat wire conveyor belt, a first connecting rod reversibly connects to a second connecting rod via an intermediate connecting rod to span the width of the flat wire conveyor belt.

In one embodiment of the flat wire conveyor belt, the first end of the plurality of connecting rods comprises a hook.

In one embodiment of the flat wire conveyor belt, a first connecting rod reversibly connects to a second connecting rod to span the width of the flat wire conveyor belt.

In one embodiment of the flat wire conveyor belt, a first connecting rod reversibly connects to a second connecting rod via an intermediate connecting rod to span the width of the flat wire conveyor belt.

One embodiment of the flat wire conveyer belt, further comprises a third set of holes located within the spacing between the plurality of linking regions on the plurality of pickets, wherein the third set of holes comprises one or more holes.

In one embodiment of the flat wire conveyer belt, the plurality of connecting rods reversibly connects to the picket via the third set of holes.

Another aspect of the present invention is a flat wire conveyor belt comprising: a plurality of pickets, wherein each picket comprises a first end and a second end, and each picket has a length defining the width of a flat wire conveyor belt; a plurality of linking regions bendably formed and spaced along the length of each picket, wherein each linking region has a first set of holes and a second set of holes; a plurality of first edge linking regions, wherein each first edge linking region is the linking region formed at the first end of the picket, and each first edge linking region comprises a first outer edge hole wherein the first outer edge hole is the hole in the first set of holes formed nearest to the first end of each picket; a plurality of second edge linking regions, wherein each second edge linking region is the linking region formed at the second end of each picket, and each second edge linking region comprises a second outer edge hole wherein the second outer edge hole is the hole in the first set of holes formed nearest to the second end of each picket; and a plurality of U-shaped connecting rods, wherein each U-shaped connecting rod comprises a first linking arm substantially parallel to a second linking arm, wherein each first linking arm comprises a first end and the first linking arm is configured to pass through the first set of holes of at least one linking region on a first picket and the second set of holes of at least one linking region on a second picket, wherein each second linking arm comprises a second end and the second linking arm is configured to pass through the first set of holes of at least one linking region on the second picket and the second set of holes of at least one linking region on a third picket, thereby reversibly linking three adjoining pickets and incrementally extending a length of the flat wire conveyor belt.

In one embodiment of the flat wire conveyer belt, the first outer edge holes and the second outer edge holes further comprise an inner surface and the connecting rods further comprise an outer surface, and wherein the inner surface of the outer edge holes is in contact with the outer surface of the connecting rods, thereby strengthening the edge of the flat wire conveyor belt.

In one embodiment of the flat wire conveyer belt, the U-shaped connecting rod's first end and second end are hooks.

In one embodiment of the flat wire conveyor belt, the plurality of U-shaped connecting rods has a length that is less than the width of the flat wire conveyor belt.

In one embodiment of the flat wire conveyor belt, a first U-shaped connecting rod reversibly connects to a second U-shaped connecting rod to span the width of the flat wire conveyor belt.

In one embodiment of the flat wire conveyor belt, a first U-shaped connecting rod reversibly connects to a second U-shaped connecting rod via an intermediate connecting rod to span the width of the flat wire conveyor belt.

One embodiment of the flat wire conveyer belt, further comprises a third set of holes located within the spacing between the plurality of linking regions on the plurality of pickets, wherein the third set of holes comprises one or more holes.

In one embodiment of the flat wire conveyer belt, the U-shaped connecting rods reversibly connect to the picket via the third set of holes.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWING

These and other features and advantages of the present invention will be better understood by reading the following detailed description of preferred embodiments, taken together with the drawings wherein:

FIG. 11 is a detailed view of the edge of a preferred embodiment of the present invention.

DETAILED DESCRIPTION OF THE INVENTION

The present invention comprises a method and apparatus related to a flat wire conveyor belt having multiple part connecting rods and strengthened edges.

Figure 1:
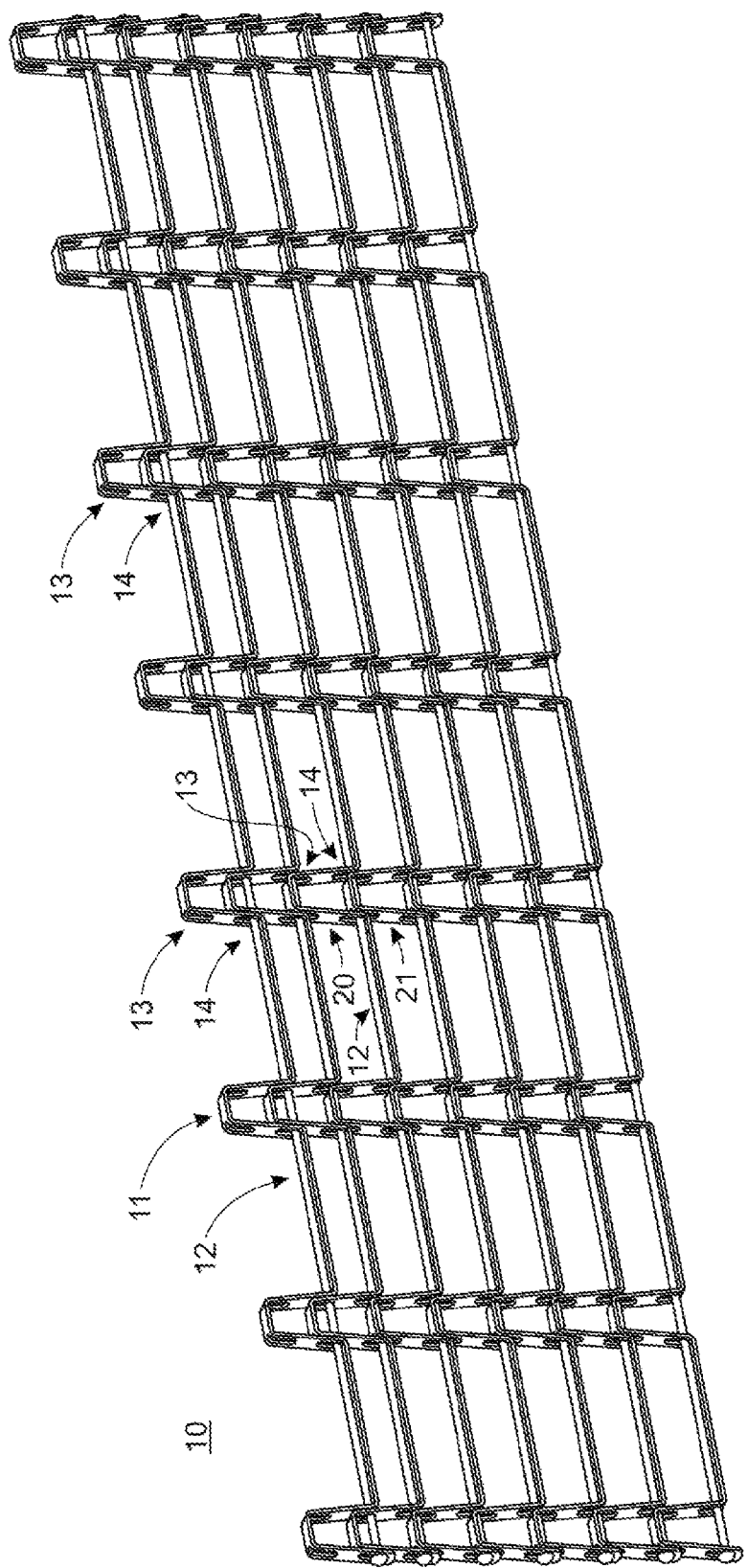
FIG. 1 is a schematic view of a flat wire belt of the prior art.
Figure 2:
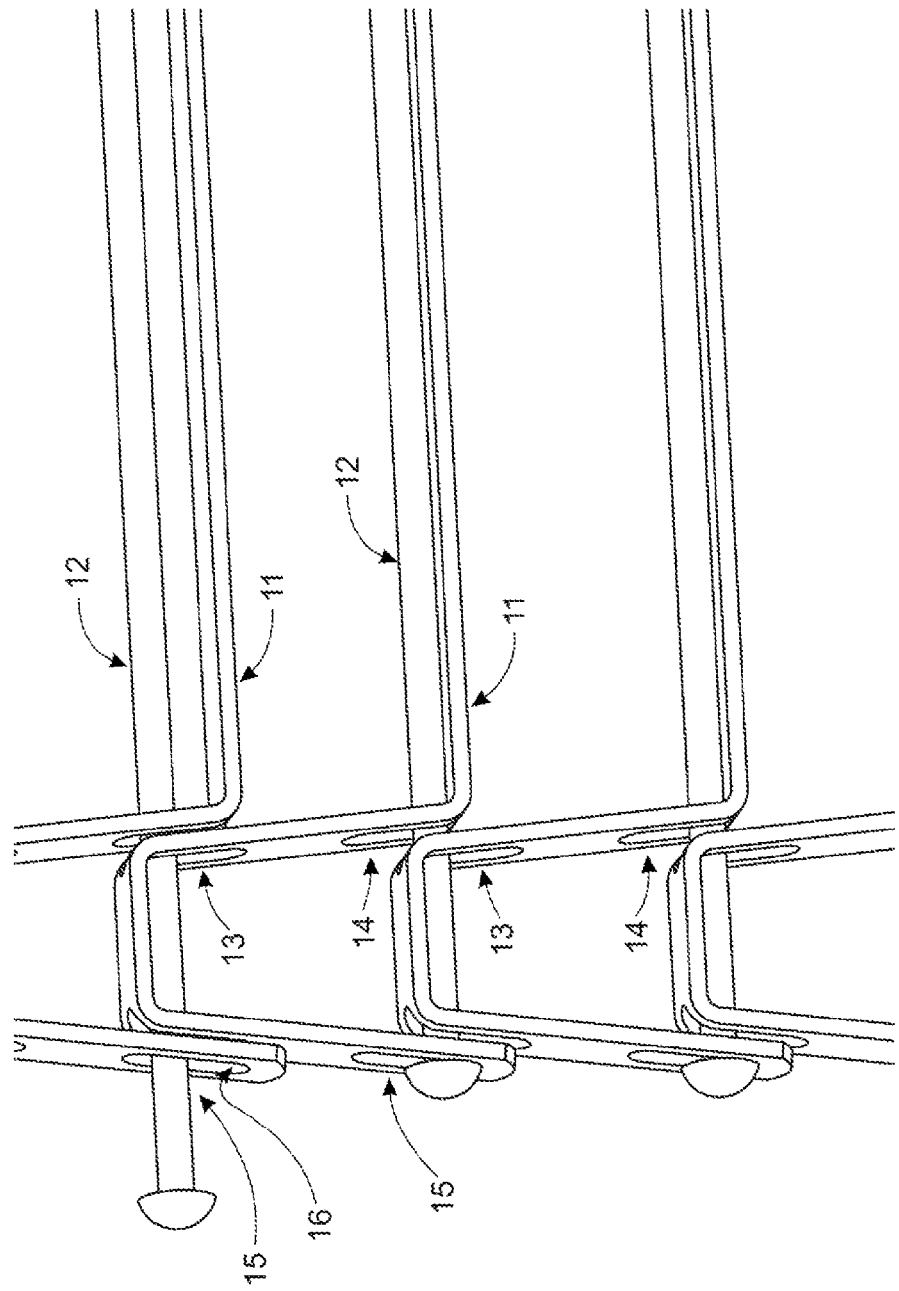
FIG. 2 is a schematic view of an edge of a flat wire belt of the prior art.
Figure 3:
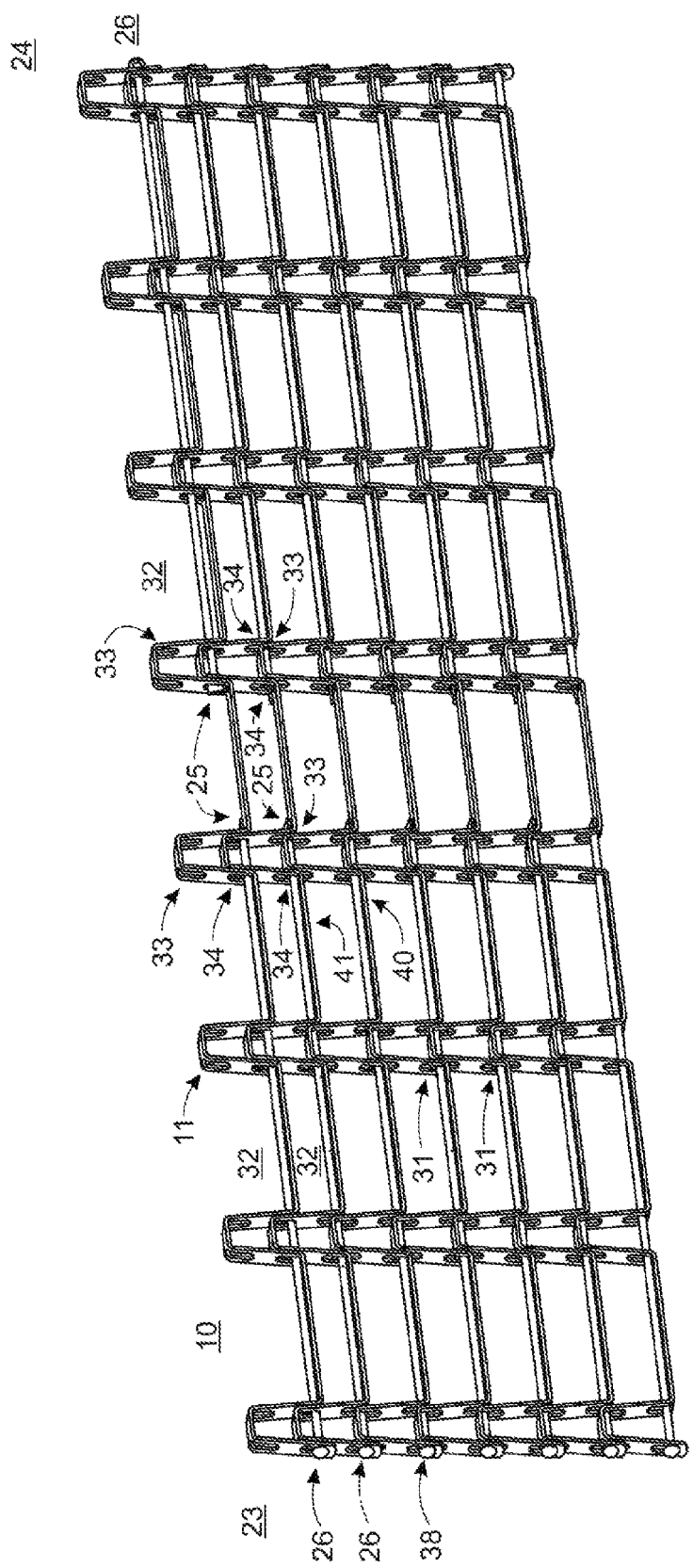
FIG. 3 is a schematic view of a preferred embodiment of the present invention.

As shown in FIG. 3, in one preferred, embodiment, multiple pickets 31, each with a first end 23 and a second end 24, which extend the full width of the flat wire belt 10, are held together with multiple connecting rods 32, each with a first end 25 and a second end 26. Each picket 31 has a first set of holes 33 and a second set of holes 34. Each picket is bent so adjoining pickets 40, 41 can be arranged to allow the first end 25 of a connecting rod 32 to be inserted from the first end 23 of the picket 31 through some of the holes in the first set of holes 33 of one picket 40 and some of the holes in the second set of holes 34 of the adjoining picket 41.

The first end 25 of the connecting rod 32 is configured to attach to a picket 11. As shown in FIG. 3, a preferred embodiment has a connecting rod 32 with a first end 25 configured with a hook, which hook can be attached through a hole 37 in the picket 11. The second end 26 of the connecting rod 32 is flattened so that it may go through, as shown in FIG. 3, the hole in the second set of holes 34 that is closest to the first end 23 of the picket when inserted one way but cannot go through the hole when the connecting rod is rotated 90° (or any whole number multiple of 90°. It should be noted that the second end 26 of the connecting rod 32 may have a welded button, or other means known to those skilled in the art, that is larger than the hole in the second set of holes 34 that is closest to the first end 23 attic picket.

Figure 4:
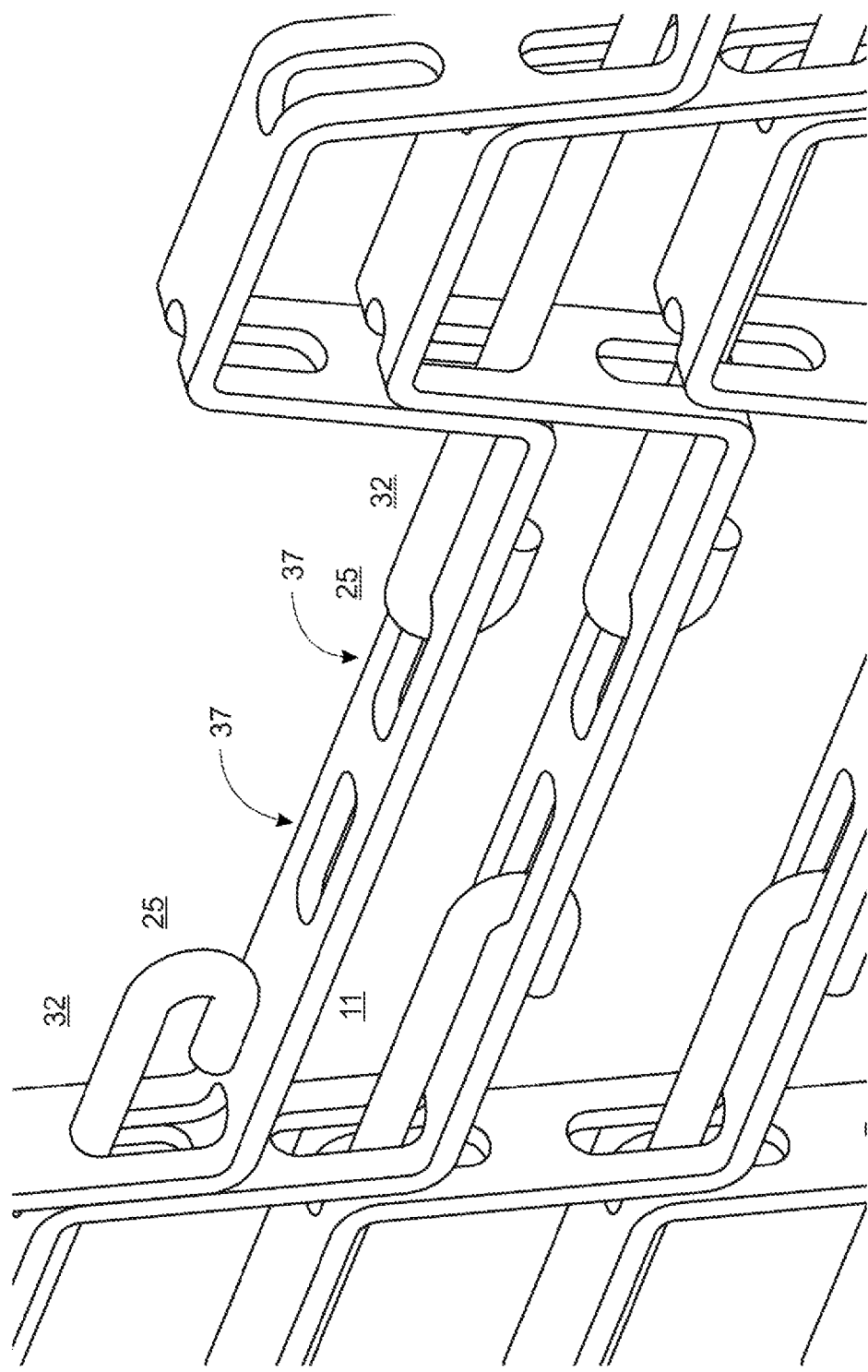
FIG. 4 is a more detailed schematic view of the preferred embodiment of the present invention in FIG. 3.

The other side of the flat wire belt is similar. The first end 25 of a connecting rod 32 is then inserted from the second end 24 of the pickets 40, 41 through some of the holes in the first set of holes 33 of one picket 40 and some of the holes in the second set of holes 34 of the adjoining picket 41. The first end 25 of the connecting rod 32 is then hooked into a hole 37 in the picket 11 as shown in FIG. 4. Two connecting rods are used to connect each set of adjoining pickets in the flat wire belt.

Figure 5:
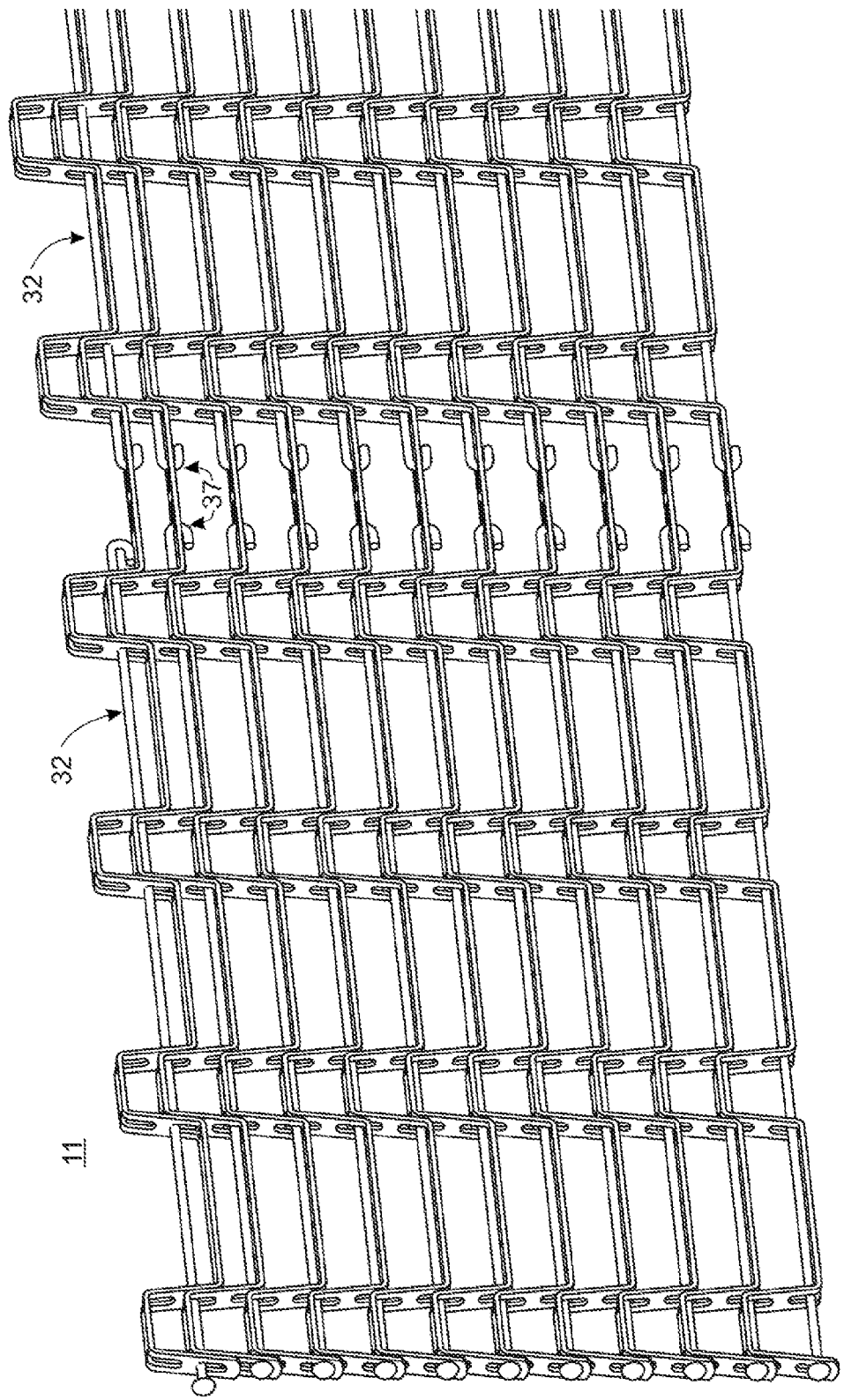
FIG. 5 is another schematic view of the preferred embodiment of the present invention in FIG. 3.

It should be noted that in the above-described preferred embodiment the connecting rods 32 are all equal in length, and as shown in FIG. 5, connect to holes 37 in the middle of a picket 11. The connecting rods 32 need not be equal in length and need nut extend the full width of the wire belt.

Figure 6:
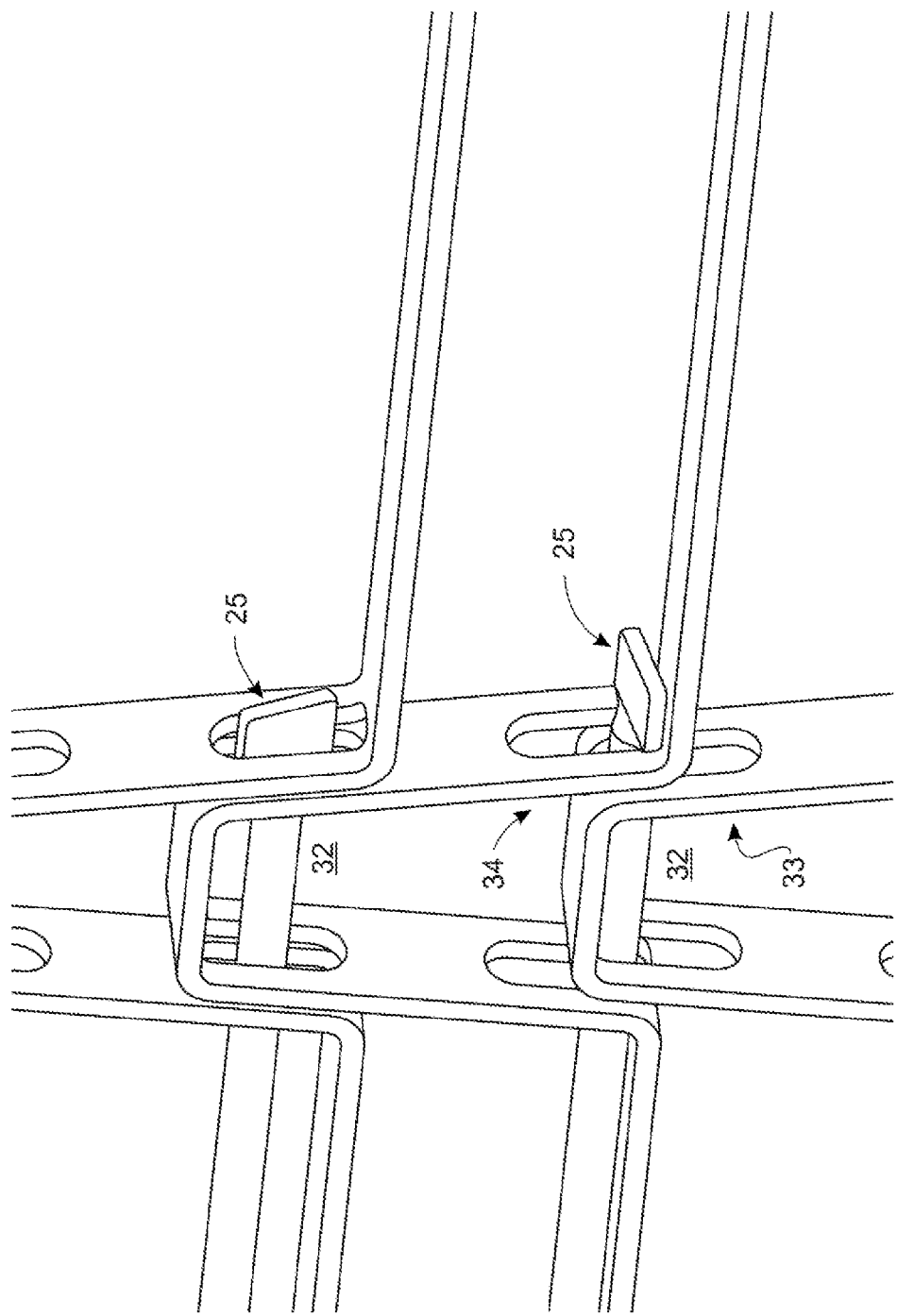
FIG. 6 is a more detailed view of another preferred embodiment of the present invention.

Other preferred embodiments may use other attachment means known to those skilled in the art on the first end of the connecting rods and the pickets. In one preferred embodiment, as shown in FIG. 6, the first end 25 of the connecting rod 32 is flattened so that it may go through the holes 33, 34 in the picket when inserted one witty, but cannot go through the holes in the pickets when the connecting rod 32 is rotated 90° (or any whole number multiple of 90°).

Figure 7:
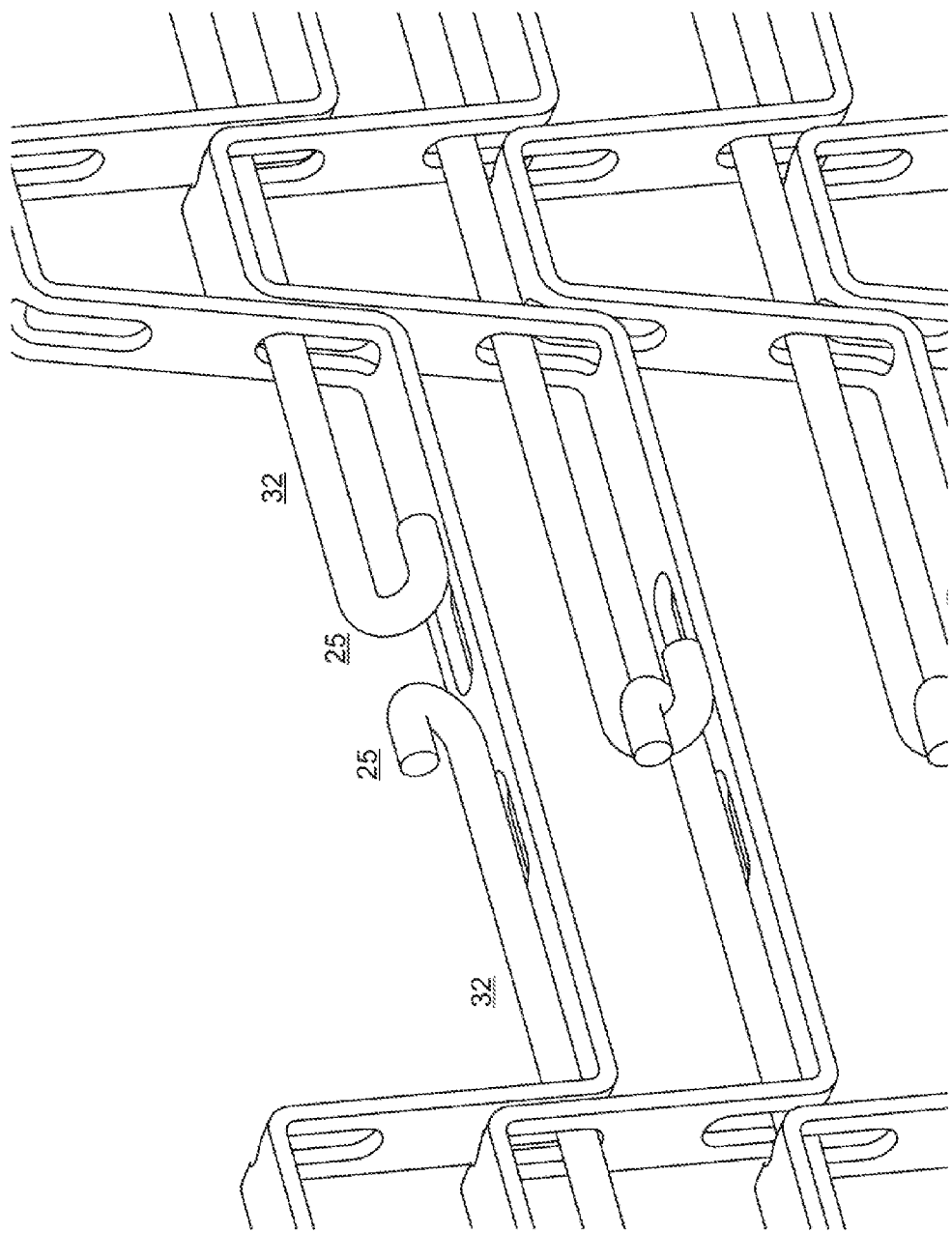
FIG. 7 is a more detailed view of another preferred embodiment of the present invention.

In another embodiment, the first end of the connecting rods inserted from the first side of the pickets have means to attach to the first end of the connecting rods inserted from the second side of the picket which in turn have means to attach to the first end of the connecting rods inserted from the fast side of the pickets. As shown in FIG. 7, the first ends 25 of the connecting rods 32 are configured with hooks on the end so that they can be hooked together.

Figure 8:
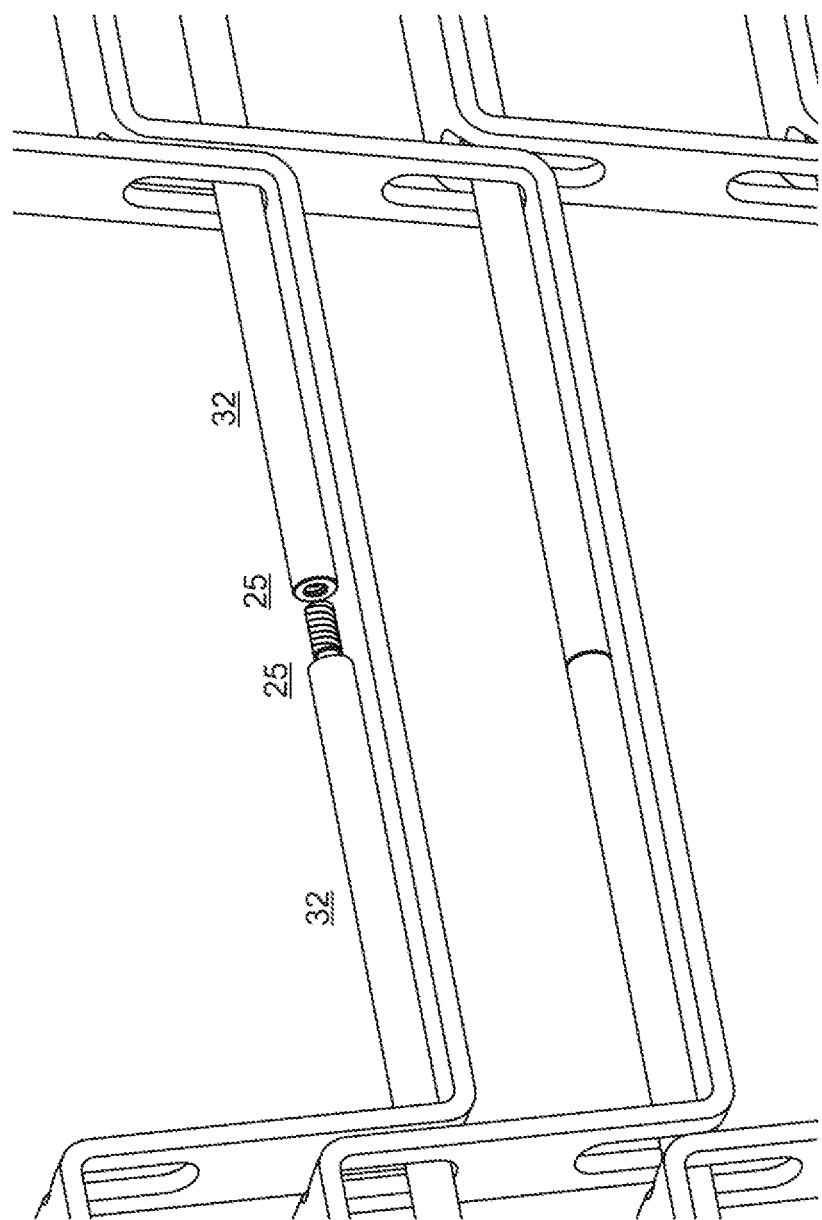
FIG. 8 is a more detailed view of another preferred embodiment of the present invention.

Alternatively, as shown in FIG. 8, the first end 25 of the connecting rods 32 inserted from the first side of the pickets is threaded to attach by screwing into an opening in the first end 25 of the connecting rods inserted from the second side of the pickets.

Figure 9:
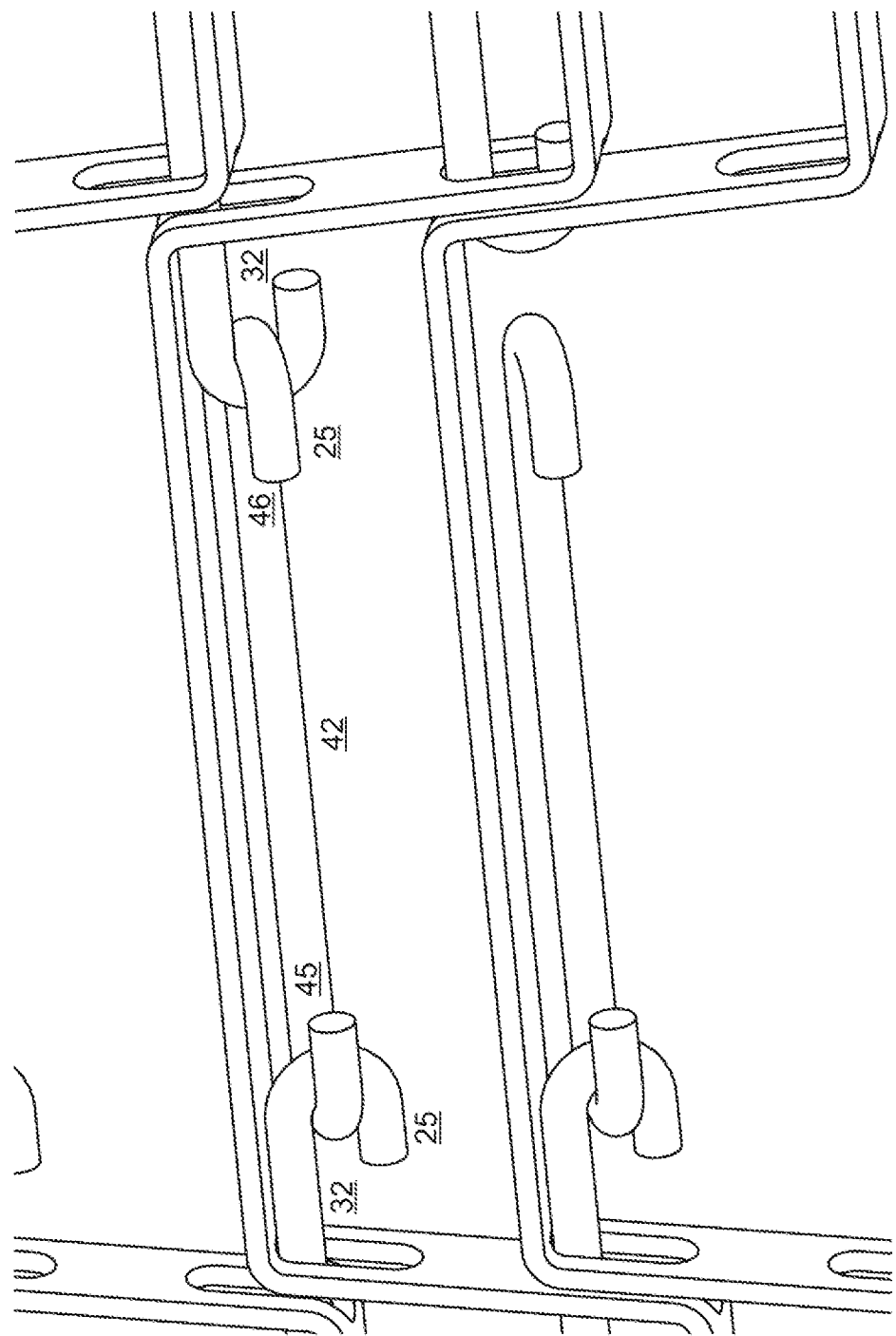
FIG. 9 is a more detailed view of another preferred embodiment of the present invention.

In another embodiment, as shown in FIG. 9, an intermediary connecting rod 42 with a first end 45 and a second end 46 is used to connect the connecting rods 32. The first end 45 of the intermediary connecting rod 42 is attached to the first end 25 of the connecting rod inserted from the first side of the picket, and the second end 46 of the intermediary connecting rod 32 is attached to the first end 25 of the connecting rod 32 inserted from the second side of the picket. The ends of the connecting rods and the intermediary connecting rod can be attached using hooks as shown here or using other attachment means described herein for attaching the first ends of the connecting rods to a picket or to each other.

A number of different means for attaching the first end of connecting rods to a picket, another connecting rod or an intermediary connecting rod are described herein. It should be noted that different attachment means may be used in different sections of one flat wire belt.

Figure 10:
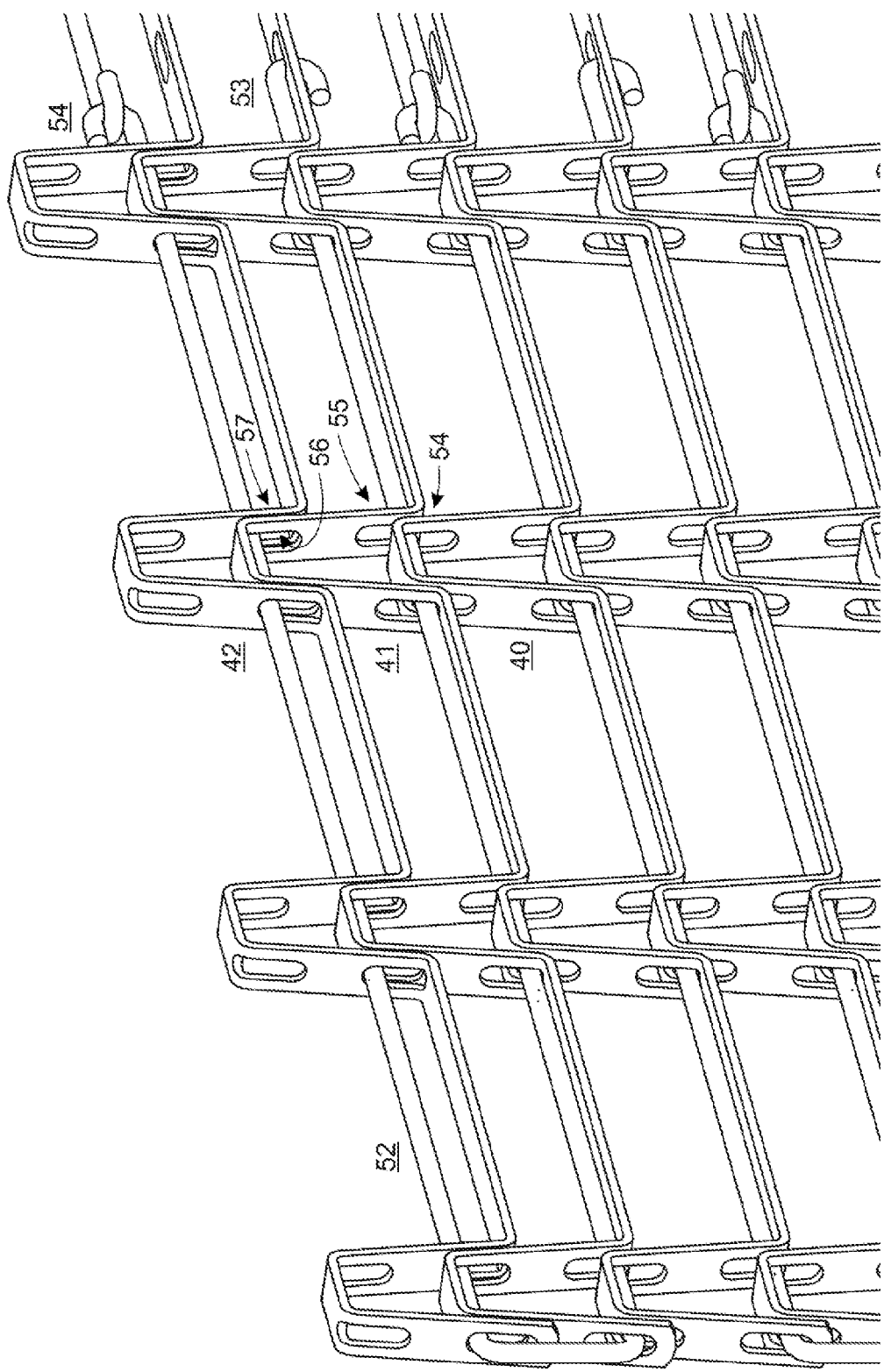
FIG. 10 is a more detailed view of another preferred embodiment of the present invention.

In another embodiment, as shown in FIG. 10, connecting rod 52 is U-shaped so that its first end 53 is inserted through each of the holes in the first set of holes 54 in one picket 40 and each of the holes in the second set of holes 55 of the adjoining picket 41. The second end 54 of connecting rod 52 is inserted through each of the holes in the first set of holes 56 in picket 41 and each of the holes in the second set of holes 57 of the adjoining picket 42.

The present invention also compromises a flat wire belt with strengthened edges. One preferred embodiment is shown in FIG. 11.

A picket 11 has a second set of holes 14. All the holes 15 in the second set of holes 14 are the same length (measured parallel to the long dimension of the picket 11). For a given picket 11, the hole 15, in the second set of holes 14, at each end of the picket is not in a section of the picket that is bent as all the other holes in the second set of holes 14 are. The result of this is that the part of the picket forming the wall 16 of the hole closest to the end of the picket does not contact the connecting rod 12 inserted through it, weakening the flat wire belt. In this embodiment the length of the hole 15 is shortened so that the part of the picket forming the wall 16 of the hole closest to the end of the picket contacts the connecting rod 12 inserted through it. Alternatively, the hole 15 can be moved toward the middle of the picket so that the part of the picket forming the wall 16 of the hole contacts the connecting rod 12 inserted through it.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A flat wire conveyor belt comprising:
   a plurality of pickets, wherein each picket comprises a first end and a second end, and each picket has a length defining the width of a flat wire conveyor belt;
   a plurality of linking regions bendably formed and spaced along the length of each picket, wherein each linking region has a first set of holes and a second set of holes;
   a plurality of first edge linking regions, wherein each first edge linking region is the linking region formed at the first end of the picket, and each first edge linking region comprises a first outer edge hole wherein the first outer edge hole is the hole in the first set of holes formed nearest to the first end of each picket;
   a plurality of second edge linking regions, wherein each second edge linking region is the linking region formed at the second end of each picket, and each second edge linking region comprises a second outer edge hole wherein the second outer edge hole is the hole in the first set of holes formed nearest to the second end of each picket;
   a third set of holes located within the spacing between the plurality of linking regions on the plurality of pickets, wherein the third set of holes comprises one or more holes; and
   a plurality of connecting rods, wherein each connecting rod comprises a first end and a second end, and each connecting rod is configured to pass through the first set of holes of at least one linking region on a first picket and the second set of holes of the at least one linking region on an adjoining picket, and each connecting rod has a length less than the width of the flat wire conveyor belt, thereby reversibly linking two adjoining pickets and incrementally extending a length of the flat wire conveyor belt and wherein the plurality of connecting rods reversibly connect to the picket via the third set of holes.

2. The flat wire conveyor belt of claim 1, wherein the first outer edge holes and the second outer edge holes further comprise an inner surface and the plurality of connecting rods further comprise an outer surface, and wherein the inner surface of the outer edge holes is in contact with the outer surface of the connecting rods, thereby strengthening the edge of the flat wire conveyor belt.

3. The flat wire conveyor belt of claim 1, wherein the first end of the plurality of connecting rods comprises a hook.

4. A flat wire conveyor belt comprising:
   a plurality of pickets, wherein each picket comprises a first end and a second end, and each picket has a length defining the width of a flat wire conveyor belt;
   a plurality of linking regions bendably formed and spaced along the length of each picket, wherein each linking region has a first set of holes and a second set of holes;
   a plurality of first edge linking regions, wherein each first edge linking region is the linking region formed at the first end of the picket, and each first edge linking region comprises a first outer edge hole wherein the first outer edge hole is the hole in the first set of holes formed nearest to the first end of each picket;
   a plurality of second edge linking regions, wherein each second edge linking region is the linking region formed at the second end of each picket, and each second edge linking region comprises a second outer edge hole wherein the second outer edge hole is the hole in the first set of holes formed nearest to the second end of each picket;

a third set of holes located within the spacing between the plurality of linking regions on the plurality of pickets, wherein the third set of holes comprises one or more holes; and a plurality of U-shaped connecting rods, wherein each U-shaped connecting rod comprises a first linking arm substantially parallel to a second linking arm, wherein each first linking arm comprises a first end and the first linking arm is configured to pass through the first set of holes of at least one linking region on a first picket and the second set of holes of at least one linking region on a second picket, wherein each second linking arm comprises a second end and the second linking arm is configured to pass through the first set of holes of at least one linking region on the second picket and the second set of holes of at least one linking region on a third picket, thereby reversibly linking three adjoining pickets and incrementally extending a length of the flat wire conveyor belt and wherein the U-shaped connecting rods reversibly connect to the picket via the third set of holes.

5. The flat wire conveyor belt of claim 4, wherein the first outer edge holes and the second outer edge holes further comprise an inner surface and the connecting rods further comprise an outer surface, and wherein the inner surface of the outer edge holes is in contact with the outer surface of the connecting rods, thereby strengthening the edge of the flat wire conveyor belt.

6. The flat wire conveyor belt of claim 4, wherein the U-shaped connecting rod's first end and second end are hooks.

* * * * *